United States Patent
Legallais et al.

(10) Patent No.: US 12,192,003 B2
(45) Date of Patent: Jan. 7, 2025

(54) NETWORK EQUIPMENT AND METHOD FOR DELIVERING DATA PACKETS

(71) Applicant: InterDigital CE Patent Holdings, SAS, Paris (FR)

(72) Inventors: Yvon Legallais, Rennes (FR); Charline Taibi Guguen, Cesson-Sevigne (FR); Remi Houdaille, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/299,489

(22) PCT Filed: Nov. 27, 2019

(86) PCT No.: PCT/EP2019/082775
§ 371 (c)(1),
(2) Date: Jun. 3, 2021

(87) PCT Pub. No.: WO2020/114862
PCT Pub. Date: Jun. 11, 2020

(65) Prior Publication Data
US 2022/0123869 A1     Apr. 21, 2022

(30) Foreign Application Priority Data
Dec. 6, 2018    (EP) .................... 18306627

(51) Int. Cl.
*H04L 1/1607*    (2023.01)
*H04L 1/1867*    (2023.01)
(Continued)

(52) U.S. Cl.
CPC ............ *H04L 1/1657* (2013.01); *H04L 1/188* (2013.01); *H04L 65/61* (2022.05); *H04L 69/163* (2013.01)

(58) Field of Classification Search
None
See application file for complete search history.

(56) References Cited

U.S. PATENT DOCUMENTS 9,565,162 B2    2/2017   Kim et al.
9,768,935 B2    9/2017   Ido et al.
(Continued)

FOREIGN PATENT DOCUMENTS

CN    101174930 A  *  5/2008
CN    101543015 A     9/2009
(Continued)

OTHER PUBLICATIONS

English Abstract for CN 105933242 A, a machine translation for "Method and System for Improving TCP Response Speed of Data Center".
(Continued)

*Primary Examiner* — Younes Naji
(74) *Attorney, Agent, or Firm* — Condo Roccia Koptiw LLP

(57) ABSTRACT

During the delivery of a sequence of packets from a server to a client device, when an expiration time associated with an initial payload of a data packet belonging to a sliding window for delivery is reached without reception of a corresponding acknowledgment from the device, the server (300) resends the data packet with a new payload corresponding to the initial payload of a next data packet to be transmitted through the sliding window.

20 Claims, 8 Drawing Sheets

(51) Int. Cl.
*H04L 65/61* (2022.01)
*H04L 69/163* (2022.01)

(56) References Cited

U.S. PATENT DOCUMENTS

| | | | |
|---|---|---|---|
| 9,774,353 B2* | 9/2017 | Sugimoto | H03M 13/35 |
| 10,462,218 B1* | 10/2019 | Moraru | H04W 28/065 |
| 2002/0101872 A1* | 8/2002 | Boivie | H04L 45/00 |
| | | | 714/48 |
| 2017/0187497 A1* | 6/2017 | Walid | H04L 5/0055 |
| 2019/0253364 A1 | 8/2019 | Li et al. | |

FOREIGN PATENT DOCUMENTS

| | | | |
|---|---|---|---|
| CN | 104601484 A | 5/2015 | |
| CN | 105933242 A | 9/2016 | |
| CN | 107645790 A | 1/2018 | |
| CN | 108011834 A | 5/2018 | |
| EP | 1898586 A1 | 3/2008 | |
| EP | 2076041 A1 | 7/2009 | |
| EP | 2840752 A1 | 2/2015 | |
| JP | 2004243003 A * | 9/2004 | |
| JP | 2005502125 * | 1/2005 | H04L 47/10 |
| JP | 2005502125 A * | 1/2005 | H04L 47/10 |
| JP | 3784801 B2 * | 6/2006 | H04L 1/1621 |
| JP | 4511174 B2 * | 7/2010 | H04L 1/1832 |
| WO | 2008053458 A2 | 5/2008 | |
| WO | WO 2008134897 A1 | 11/2008 | |

OTHER PUBLICATIONS

English Abstract for CN 107645790 A, a machine translation for "Transmission Control Protocol (TCP) Link Establishing Method and Base Station".

Ma Lin, "Techniques and Protocols for Distributed Media Streaming", National University of Singapore, A Thesis submitted for Degree of Doctor of Philosophy, Department of Computer Science, 2007, 152 pages.

Allman et al., "TCP Congestion Control", Network Working Group, Request for Comments: 5681, Obsoletes: 2581 ICSI, Category: Standards Track, Sep. 2009, 18 pages.

Anonymous et al., "Transmission Control Protocol—DARPA Internet Program Protocol Specification", Information Sciences Institute, University of Southern California, Request for Comments: 793, Prepared for DARPA Information Processing Techniques Office, Sep. 1981, 90 pages.

English Abstract for CN 104601484 B, a machine translation for "Sending a TCP Offload Engine Unit".

Mathis et al., "TCP Selective Acknowledgment Options", Network Working Group, Request for Comments: 2018. Category: Standards Track, Oct. 1996, 12 pages.

Unknown, "Transmission Control Protocol", Wikipedia, Nov. 25, 2018, 8 pages (retrieved on Jan. 1, 2023 from the internet: https://en.wikipedia.org/w/index.php?title=Transmission Control Protocol &old id=870477856).

* cited by examiner

NETWORK EQUIPMENT AND METHOD FOR DELIVERING DATA PACKETS

CROSS REFERENCE TO RELATED APPLICATIONS

This application is the national stage entry under 35 U.S.C. § 371 of International Application PCT/EP2019/082775 filed Nov. 27, 2019, which was published in accordance with PCT Article 21(2) on Jun. 11, 2020, in English, and which claims the benefit of European Patent Application No. 18306627.3, filed Dec. 6, 2018.

TECHNICAL FIELD

The present disclosure generally relates to the delivery of a sequence of data packets for conveying a multimedia content from a network equipment to a client device.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

TCP (Transmission Control Protocol) is a network communication protocol designed to send data packets over the Internet Protocol (IP). It provides a reliable delivery for almost all the applications used over Internet, including the Web applications, File Transfer Protocol applications, Secure Shell applications, peer-to-peer file sharing, and even streaming media applications.

While TCP has been designed with an objective of accuracy rather than timely delivery, it has been largely used for video streaming, notably with the adoption of HTTP Adaptive Streaming (HAS).

In particular, HTTP adaptive video streaming technologies are pushed by various stakeholders to allow provision of over the top audiovisual delivery in the Internet. Such technologies allow a client device to receive video in the form of small successive segments (a few seconds long), so called chunk. Each segment is requested through the HTTP protocol and may exist in different variants (so called representations, for adaptive streaming protocols), allowing the client device to choose at any time an appropriate bit rate matching the network and device constraints.

In video streaming, the client device plays a central role by controlling video adaptation, since HTTP is a stateless protocol. It allows to deploy legacy HTTP servers and caches instead of specialized streaming equipment. HTTP-based delivery prevents from NAT (Network Address Translation) and firewall traversal issues.

As a reliable stream delivery service, the TCP protocol guarantees that all the received bytes will be identical to the bytes sent and in correct order. When sending a data packet (called segment in the TCP terminology), the transmitted data is put into a retransmission queue and timers associated with the data packets are triggered. When no acknowledgment for a segment is received before the timer runs out, a retransmission occurs, i.e. the segment is retransmitted up to its acknowledgement by the client device or until a (long) timeout expires (in that case, the connection is considered broken and will be closed).

Nevertheless, such a behavior can be inappropriate when delivered data have real time constraints (which is the case in video streaming). Indeed, a video segment has no reason to be delivered anymore when the time for processing and rendering at the destination application is exceeded.

The present disclosure has been devised with the foregoing in mind.

SUMMARY

According to one or more embodiments, there is provided a network equipment configured to be in communication with a device through a network for delivering data packets comprising an initial payload,
said network equipment comprising one or more processors configured for:
  obtaining an expiration time for the initial payload of the data packets to be delivered to the device,
  delivering to the device data packets belonging to a sliding window moving according to data packet acknowledgments,
  when the expiration time of the initial payload of a data packet belonging to the sliding window is reached without reception of a corresponding acknowledgment from the device, resending said data packet with a new payload corresponding to the initial payload of at least one next data packet to be transmitted through the sliding window.

According to one or more embodiments, there is provided a method to be implemented at a network equipment configured to be in communication with a device through a network for delivering data packets comprising an initial payload,
said method comprising:
  obtaining an expiration time for the initial payload of the data packets to be delivered to the device,
  delivering to the device data packets belonging to a sliding window moving according to data packet acknowledgments,
  when the expiration time of the initial payload of a data packet belonging to the sliding window is reached without reception of a corresponding acknowledgment from the device, resending said data packet with a new payload corresponding to the initial payload of at least one next data packet to be transmitted through the sliding window.

According to one or more embodiments, there is provided a device configured to be in communication with a network equipment through a network for receiving data packets comprising an initial payload,
said device comprising one or more processors configured for:
  receiving from the network equipment data packets belonging to a sliding window moving according to data packet acknowledgments,
  when an expiration time of the initial payload of a data packet belonging to the sliding window is reached without sending of a corresponding acknowledgment by the device, receiving said data packet with a new payload corresponding to the initial payload of at least one next data packet to be transmitted through the sliding window.

According to one or more embodiments, there is provided a method to be implemented at device configured to be in communication with a network equipment through a network for receiving data packets comprising an initial payload, said method comprising:
receiving from the network equipment data packets belonging to a sliding window moving according to data packet acknowledgments,
when an expiration time of the initial payload of a data packet belonging to the sliding window is reached without sending of a corresponding acknowledgment by the device, receiving said data packet with a new payload corresponding to the initial payload of at least one next data packet to be transmitted through the sliding window.

According to one or more embodiments, there is provided a computer program product at least one of downloadable from a communication network and recorded on a non-transitory computer readable medium readable by at least one of computer and executable by a processor, comprising program code instructions for performing a method to be implemented at a network equipment configured to be in communication with a device through a network for delivering data packets comprising an initial payload, said method comprising:
obtaining an expiration time for the initial payload of the data packets to be delivered to the device,
delivering to the device data packets belonging to a sliding window moving according to data packet acknowledgments,
when the expiration time of the initial payload of a data packet belonging to the sliding window is reached without reception of a corresponding acknowledgment from the device, resending said data packet with a new payload corresponding to the initial payload of at least one next data packet to be transmitted through the sliding window.

According to one or more embodiments, there is provided a non-transitory program storage device, readable by a computer, tangibly embodying a program of instructions executable by the computer to perform a method to be implemented at a network equipment configured to be in communication with a device through a network for delivering data packets comprising an initial payload, said method comprising:
obtaining an expiration time for the initial payload of the data packets to be delivered to the device,
delivering to the device data packets belonging to a sliding window moving according to data packet acknowledgments,
when the expiration time of the initial payload of a data packet belonging to the sliding window is reached without reception of a corresponding acknowledgment from the device, resending said data packet with a new payload corresponding to the initial payload of at least one next data packet to be transmitted through the sliding window.

The methods according to the one or more embodiments may be implemented in software on a programmable apparatus. They may be implemented solely in hardware or in software, or in a combination thereof.

Some processes implemented by elements of the one or more embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements can be implemented in software, some aspects of the embodiments can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The one or more embodiments thus provide a computer-readable program comprising computer-executable instructions to enable a computer to perform above mentioned methods.

Certain aspects commensurate in scope with the disclosed embodiments are set forth below. It should be understood that these aspects are presented merely to provide the reader with a brief summary of certain forms the one or more embodiments might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiments and execution examples, in no way limitative, with reference to the appended figures on which.

Wherever possible, the same reference numerals will be used throughout the figures to refer to the same or like parts.

DETAILED DESCRIPTION

Figure 1:
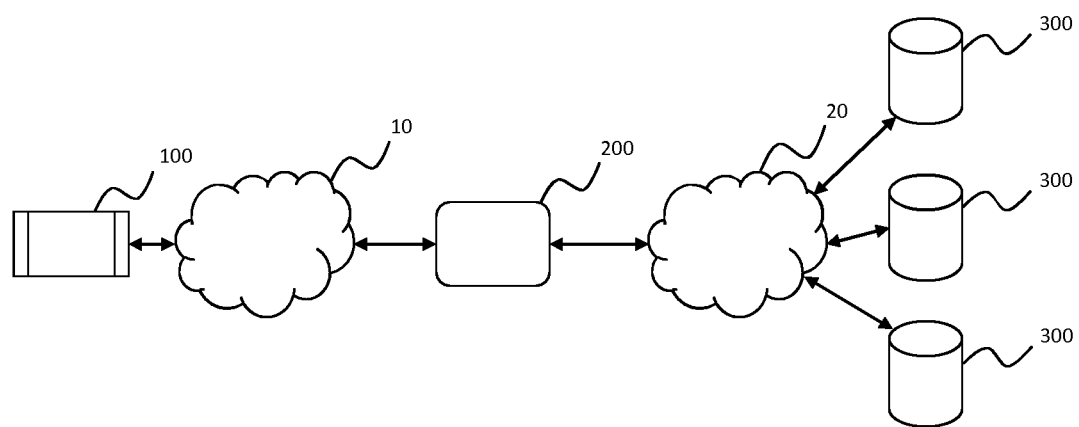
FIG. 1 is a schematic diagram of an exemplary Client-Server architecture wherein some embodiments might be implemented.

The following description illustrates some embodiments. It will thus be appreciated that those skilled in the art will be able to devise various arrangements that, although not explicitly described or shown herein, embody some aspects of the embodiments and are included within their scope.

All examples and conditional language recited herein are intended for educational purposes to aid the reader in understanding the embodiments and are to be construed as being without limitation to such specifically recited examples and conditions.

Moreover, all statements herein reciting embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying some aspects of the embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present embodiments, while eliminating, for purposes of clarity, many other elements found in typical digital multimedia content delivery methods, devices and systems. However, because such elements are well known in the art, a detailed discussion of such elements is not provided herein. Embodiments herein are directed to all such variations and modifications known to those skilled in the art.

Embodiments are depicted with regard to a streaming environment (such as adaptive streaming technologies) to deliver a multimedia content (such as video) to a client device through a delivery network. It should be naturally understood that the implementation of such embodiments is not limited to a streaming environment.

As shown in the exemplary embodiment of FIG. 1, a Client-Server network architecture, including a first network 10 (e.g. a home network, an enterprise network) and a second network 20 (e.g. a broadband network such as the Internet), comprises a client device 100 in communication with a gateway 200 and network equipment 300 such as content servers (in FIG. 1, three servers are represented). The first network 10 is for instance connected to the second network 20 through the gateway 200.

The client device 100—which is for instance a streaming client device connected to the gateway 200 through the network 10 (as a home network or an enterprise network)—wishes to connect to a server 300 (e.g. an HTTP server) through the broadband network 20 in order to launch a streaming session for retrieving a multimedia content from the Internet 20. Once the connection is established with the client device 100, the server 300 streams segments to the client device 100, upon requests, using a streaming protocol over, for instance, one or more TCP/IP connections. According to the TCP terminology, a data packet is called segment.

Figure 2:
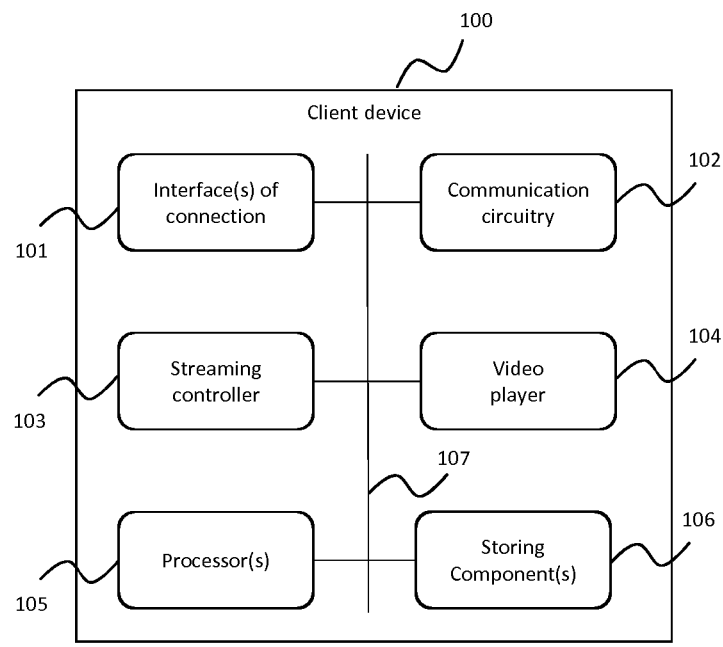
FIG. 2 is a block diagram of an exemplary client device of FIG. 1, wherein some embodiments might be implemented.

As shown in the example of FIG. 2, in one embodiment, a client device 100 of the first network 10 can comprise at least:
- interface(s) for connection 101 (wired and/or wireless, as for example Wi-Fi, Ethernet, etc.) to the network 10 or to a further network (not shown);
- communication circuitry 102 implementing the protocol stacks for communication with one or more servers 300. In particular, the communication circuitry 102 comprises the TCP/IP stack. Of course, it could be any other type of network and/or communicating means enabling a client device 100 to communicate with a server 300;
- a streaming controller 103 which receives, along a streaming session, a multimedia content from one or more servers 300 (especially the corresponding segments). In particular, in case of adaptive streaming, the streaming controller 103 can for instance continually select segments at the bit rate that better matches the network constraints and its own constraints;
- a video player 104 adapted to decode and render the multimedia content received through the streaming session. It should be understood that the streaming controller 103 and the video player 104 can be combined, in a variant, to form a single entity;
- one or more processor(s) 105 for executing the applications and programs stored in a memory of the client device 100;
- storing component(s) 106 (e.g. volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code. In particular, a volatile memory can for instance buffer segments received from a server 300 before their transmission to the video player 104;

an internal bus 107 (hardware and/or software implementation) to connect the various modules and all means well known to the skilled in the art for performing the generic client device functionalities.

As an example, the client device 100 is a portable media device, a mobile phone, a tablet or a laptop, a head mounted device, a TV set, a set-top box or the like. Naturally, the client device 100 might not comprise a complete video player, but only some sub-elements such as the ones for demultiplexing and decoding the media content and might rely upon an external means to display the decoded content to the end user.

Besides, in an embodiment, the gateway 200 can be, for instance, a Digital Subscriber Line (DSL) gateway, providing an Internet broadband access to the local network 10 through the DSL technology. Of course, the gateway could be any type of broadband gateway such as cable, fiber or wireless.

Figure 3:
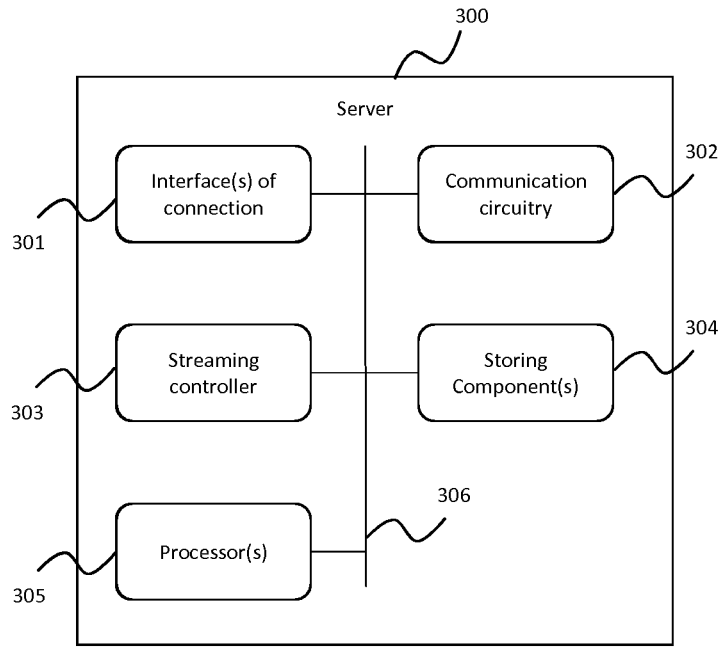
FIG. 3 is a block diagram of a server of FIG. 1, wherein some embodiments might be implemented.

As shown in the example of FIG. 3, a network equipment 300 can comprise at least:

an interface of connection 301 to the second network 20;

a communication circuitry 302 to deliver data to one or several requesting devices 100. In particular, the communication circuitry 302 can comprise the TCP/IP stack well known in the art. Of course, it could be any other type of network and/or communicating means enabling the network equipment 300 to communicate with a client device 100;

a streaming controller 303 configured to deliver a multimedia content to one or several client devices 100 during a streaming session;

storing component(s) 304, e.g. volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code;

one or more processor(s) 305 for executing the applications and programs stored in a non-volatile memory of the network equipment 300;

an internal bus 306 to connect the various modules and all means well known to the skilled in the art for performing the generic network equipment functionalities.

Figure 4:
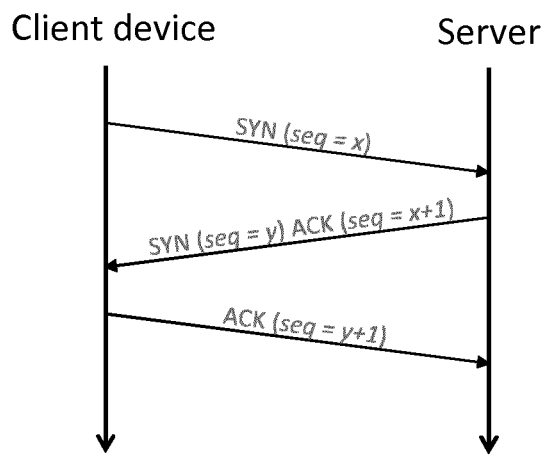
FIG. 4 shows an exemplary sequence of segments for connection establishment between a client device and a server, according to the TCP protocol.

In the example of FIG. 4, the timeline for the sequence of exchanged segments during a TCP connection establishment is the following:

the client device 100 sends a SYN segment specifying the port number of the server 300 that the client device 100 wants to connect to and the client device's Initial Sequence Number (so called ISN, set to x in the example);

the server 300 responds with its own SYN segment containing the servers Initial Sequence Number (set to y in the example). The server 300 further acknowledges the client's SYN segment with an ACK comprising the client device's ISN plus one. A SYN segment consumes one sequence number;

the client device 100 acknowledges the SYN segment delivered by the server 300 by sending an ACK segment comprising the servers ISN plus one.

The client 100 and the server 300 maintain their own 32-bit sequence number (randomly initialized) used to keep track of the amount of data they have sent. This sequence number is embedded on every transmitted segment and is acknowledged by the opposite host as an acknowledgement number to inform the sending host that the transmitted data was received successfully. The sequence number is incremented by one at each transmitted byte.

Every TCP segment comprises a TCP header specifying the sequence number (hereinafter noted SN) associated with the first byte of its payload (so called data block or data segment). Segments also carry an acknowledgment number which is the sequence number of the next expected data octet to be delivered in the reverse direction.

In the following, for clarity reasons, it is assumed that x=0 and y=0 so that, when a connection is established, the sequence numbers SN1 and SN2 respectively associated with the client device 100 and the server 300 are equal to 1 (i.e. SN1=1 and SN2=1).

Figure 5:
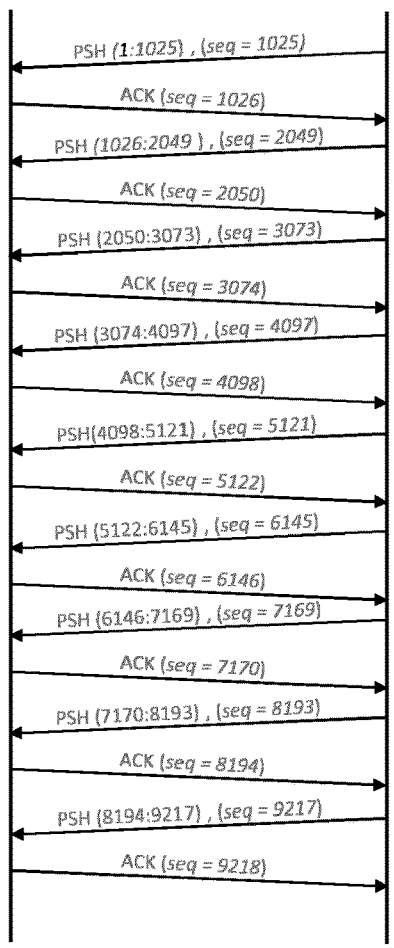
FIG. 5 shows an exemplary sequence of segments exchanged between a server and a client device through a TCP connection, every segment being correctly received and acknowledged.

Besides, FIG. 5 shows an exemplary sequence of segments exchanged between the server 300 and the client 100 along a TCP connection, every segment being correctly received and acknowledged with ACK segments. According to the TCP protocol, the ACK segments are cumulative, i.e. they acknowledge that the receiver (in the example, the client 100) has correctly received all bytes up to the acknowledged sequence number mentioned in the ACK minus one.

Figure 6:
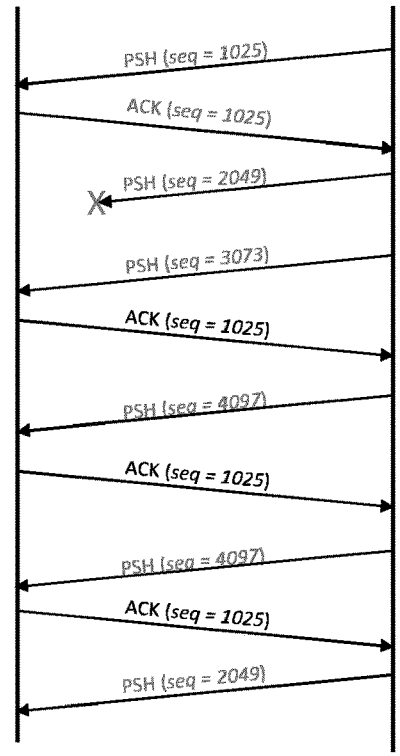
FIG. 6 shows an exemplary sequence of segments exchanged between a server and the client device through a TCP connection, wherein one segment is not acknowledged by the client device.

The example of FIG. 6 further depicts the case wherein one segment (the segment with associated sequence number equal to 2049) sent by the server 300 does not reach the client device 100. According to RFC 5681, the receiver (i.e. the client 100) sends an immediate duplicated ACK segment (i.e. the same ACK used for acknowledging a previously received segment) when an out-of-order segment arrives. This duplicated ACK segment is used to inform the sender (i.e. the server 300) that a segment was received out-of-order and which sequence number is expected.

In FIG. 6, the server 300, being not aware that something is wrong, sends segments belonging to a sliding window defined hereinafter. The client 100 receives a segment with a discontinuity in sequence number (i.e. segment with SN=3073) and then generates a duplicated ACK segment (comprising the sequence number 1025 acknowledging the first received segment). When the server 300 has received three duplicated ACK segments for the sequence number equal to 1025, it retransmits the segments following this sequence number. According to TCP paradigm, while a segment is not acknowledged, the sender will try to retransmit it.

It should be noted that the duplication of ACK segments is not the only way to manage the loss of segments and their subsequent retransmissions (for instance, a timeout can also be implemented).

Further to a limitation by available bandwidth on the communication path, the maximum achievable throughput for a single TCP connection is determined by a flow control called sliding window protocol, allowing the sender to transmit multiple segments before stopping and waiting for an acknowledgement.

The TCP sliding window protocol relies on two different variables:

a Congestion Window (cwnd) which limits the amount of data the TCP can deliver into the network before receiving an ACK segment;

a Receiver Window (rwnd) for informing of the amount of data the destination side can receive.

The sender can transmit up to the minimum of the congestion window and the advertised receiver window.

In particular, the congestion window is maintained by the source (e.g. the server 300) and determines the amount of data that can be transmitted to avoid congestion in the network. When a new connection is established with a host on another network (congestion can occur with routers or links with different bit rates on the path between the two endpoints), the congestion window is initialized at a value depending on the largest segment the sender can transmit (such a value is typically around 4000 bytes as specified in the slow start strategy of RFC 5681). Each time an ACK segment is received, the congestion window is increased by one segment. The slow start algorithm is used when the congestion window size is under a certain threshold, while the congestion avoidance algorithm is used otherwise. During congestion avoidance, the congestion window size is incremented by roughly one full-sized segment per roundtrip time (RTT). Congestion avoidance continues until a congestion is detected.

Figure 7:
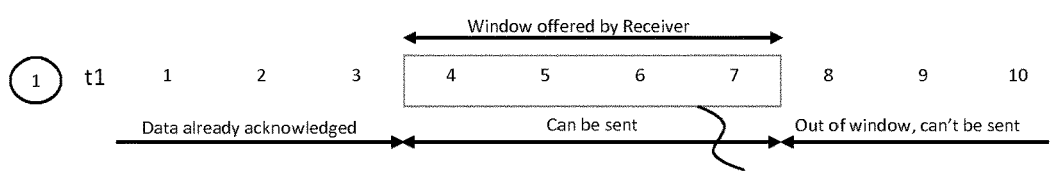
FIG. 7 depicts the evolution of a sliding window operated for transmitting a sequence of segments between a server and a client device.
Figure 7:
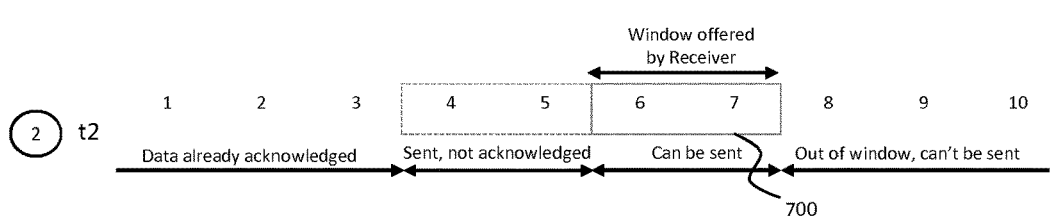
Figure 7:
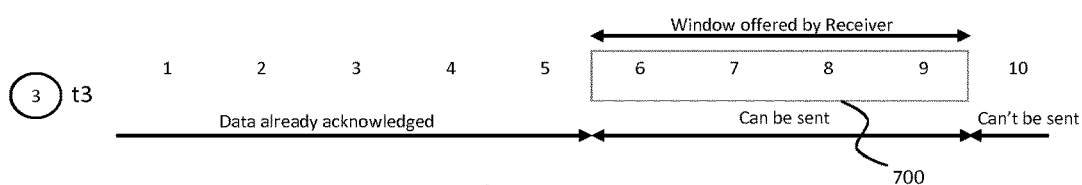

An exemplary evolution of a sliding window 700 is depicted in FIG. 7. The window (rwnd) offered by the receiver can accept 4 bytes. At a time t1, the sliding window 700 covers bytes 4 through 7 (i.e. the sender has transmitted bytes 1 to 3 and the receiver has already acknowledged the reception of the first three bytes). Over time, the sliding window 700 moves (to the right in FIG. 7), as the receiver acknowledges data. At time t2, bytes 4 and 5 are received but not acknowledged yet by the receiver, so that the left edge of the sliding window 700 moves to the right (in TCP terminology, the window closes). While those bytes are in the reception buffer, the receiver reduces its window size to 2 bytes. Once the bytes 4 and 5 have been read by the application at the receiver side, freeing up space in the TCP receiver buffer, the receiver may announce a window of 4 bytes at time t3 (in TCP terminology, the window opens), i.e. the right edge of the sliding window 700 moves to the right.

When the left edge reaches the right edge of the sliding window 700 (called a zero window), the sender stops delivering any data.

Figure 8:
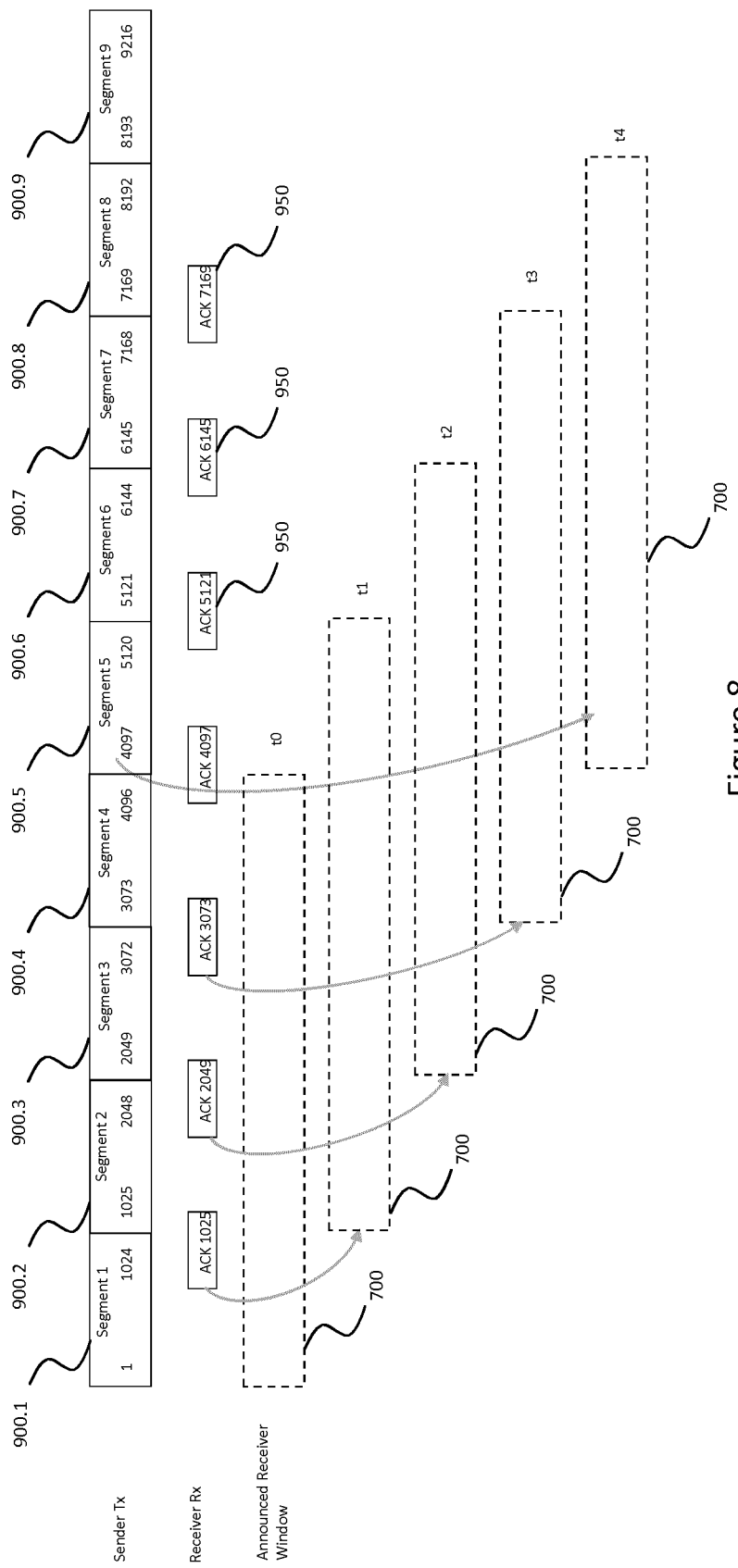
FIG. 8 shows the delivery of a sequence of segments from a server to a client device when a sliding window mechanism is implemented, every segment being received and acknowledged by the client device.

In the example of FIG. 8 representing a sequence of segments (data segments and ACK segments) of the data transfer previously described in relation to FIG. 5, the first line is a temporal representation of the data segments 900.1 to 900.9 sent or to be sent by a sender Tx (such as the server 300). The second line shows the acknowledgments positioned as they are received by the sender Tx from the receiver Rx (e.g. the client device 100). The Announced Receiver Window corresponds to the current receiver window 700 and is aligned with the sequence of segments to be transmitted at time t0.

In FIG. 8, the acknowledgment 950 of received segments implements the Selective Acknowledgment (SACK) scheme as defined in RFC 2018 (TCP Selective Acknowledgment Options) for improving performance when multiple segments are lost from one TCP sliding window of data. According to the Selective Acknowledgment scheme, the receiver can acknowledge segments received out of order. The receiver can then inform the sender about all segments that have been received successfully, so the sender needs to retransmit only the segments that have actually been lost (instead of everything from the first missing segment). The Selective Acknowledgement scheme is implemented in the form of an option in TCP protocol comprising a list of the blocks of a contiguous sequence space occupied by data that have been received and queued. According to the TCP terminology, a SACK is an ACK with SACK option providing two types of information:

a sequence number value indicating that all bytes up to sequence number minus one have been received (i.e. the ACK);

the sequence number of the first byte of a contiguous block queued at the data receiver with the sequence number immediately following the last sequence number of this block (i.e. the SACK option).

For the sake of explanation, it is considered in the example of FIG. 8 that all segments 900.1 to 900.9 have the same size of 1024 bytes and that the receiver maintains its window 700 at a size of 4096 bytes (i.e. corresponding to four segments). The receiver window (rwnd) size is embedded in the TCP header of the acknowledgement segment, so that every ACK (or SACK) segment is transmitted by the receiver with a Window Size field set to 4096 bytes. Consequently, the sliding window 700 moves to the right at each reception of a SACK acknowledging the first segment of the window.

It should be understood that maintaining the receiver window size at a constant value means that the reception of a segment from the network and the transmission of said received segment to an upper layer (or application) is performed at a same rate, in the TCP layer implemented at the receiver.

In FIG. 8, the sender Tx wishes to send Segment 1 to Segment 9 (900.1 to 900.9) to the receiver Rx announcing a receiver window of 4096 bytes size. A time t0, the sender Tx delivers the Segment 1 to Segment 4. The receiver acknowledges reception of each of these segments (when received) with a cumulative ACK specifying the sequence number of the received segment plus one. Segment 5 cannot be transmitted while Segment 1 has not been acknowledged by the receiver, according to the sliding window mechanism. When Segment 1 is acknowledged at time t1, the sliding window 700 moves to the right allowing the transmission by the sender Tx of Segment 5. This scheme is repeated when delivered segments are properly acknowledged.

Figure 9:
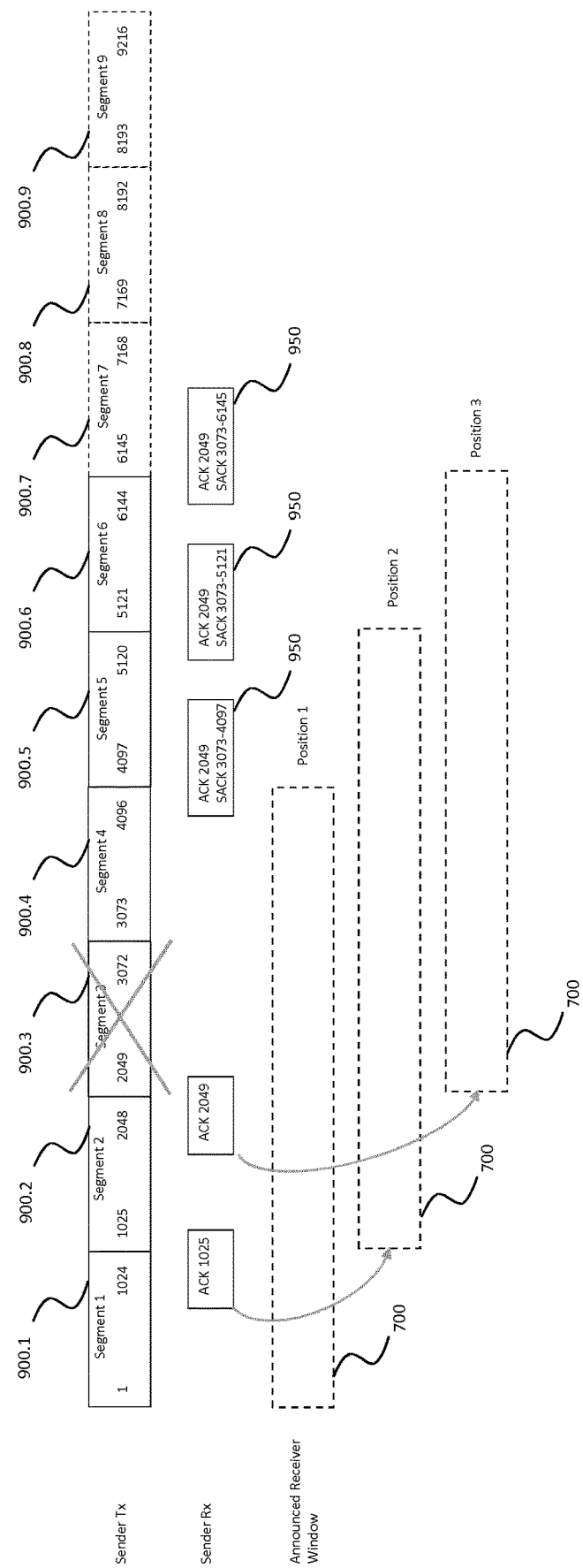
FIG. 9 shows the same delivery of segments as the one shown in FIG. 8, wherein one segment is not acknowledged by the client device.

The example illustrated in FIG. 9 is similar to the one shown in FIG. 8 except that the Segment 3 (900.3) is not acknowledged by the receiver Rx, Segment 3 never reaching the receiver Rx. The sliding window 700 is then blocked at position 3 (wherein Segments 3 to 6 are delivered by the sender Tx) and, consequently, Segment 7 cannot be sent. Once segments 4, 5 and 6 (900.4 to 900.6) have been sent and acknowledged with an ACK with a SACK option (950), the data transfer from the sender Tx is here reduced to the retransmission of Segment 3. When the data stream defined by the sequence of Segments 1 to 9 (900.1 to 900.9) is dedicated to a real time application (such as video streaming), the data transfer can be blocked or dramatically reduced in order to attempt to deliver a segment (in the example, Segment 3) which will never be used by the application if it arrives too late.

Figure 10:
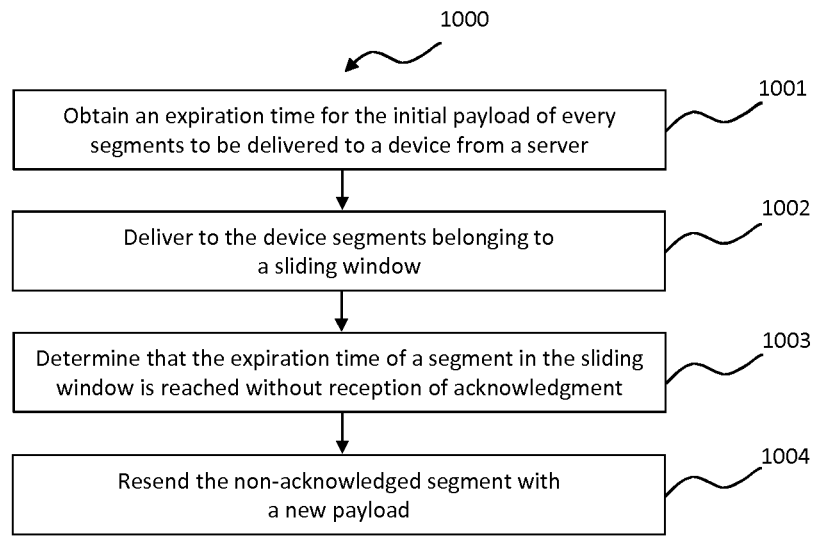
FIG. 10 is a flow chart of an exemplary method for delivering a sequence of segments from a server to a client device according to some embodiments.

In an embodiment, to overcome such a situation, a method 1000 as shown in FIG. 10 is implemented at the server 300 in communication with the device 100 through the network 10, for instance during a streaming session for delivering a multimedia content (such as a video content and/or an audio content) split into segments. In the illustrative example of a TCP connection, every segment notably comprises a TCP header and a TCP data field (i.e. a payload) and carries a sequence number (the data bytes being delivered by the TCP layer according to their sequence number).

In a step 1001, an expiration time for the initial payload of each data segment 900.1, . . . , 900.9 to be delivered to the device is obtained by the server 300 (e.g. thanks to its processor(s) 305 and/or its streaming controller 303). By implementing such an expiration time for the initial payload of each segment conveying data of the multimedia content, one can prevent the server 300 from using resources to send useless data (i.e. data which will never be used by the client device 100).

For every segment i to be delivered to the client device 100, the server 300 determines a decoding time Ti at the client side. When the multimedia content to deliver is a video or audio file, a series of compressed data (video or sound) are stored with associated decoding time in the video or audio file, so that the segmentation of the multimedia content by the server 300 implies to be audio or video coding aware. In that case, knowing the decoding time of the first frame (or picture) or audio sample, the server 300 is able to determine the decoding time of all the other frames or samples. In certain file formats, the decoding time of a frame or an audio sample is provided, for instance in the form of a timestamp.

Figure 11:
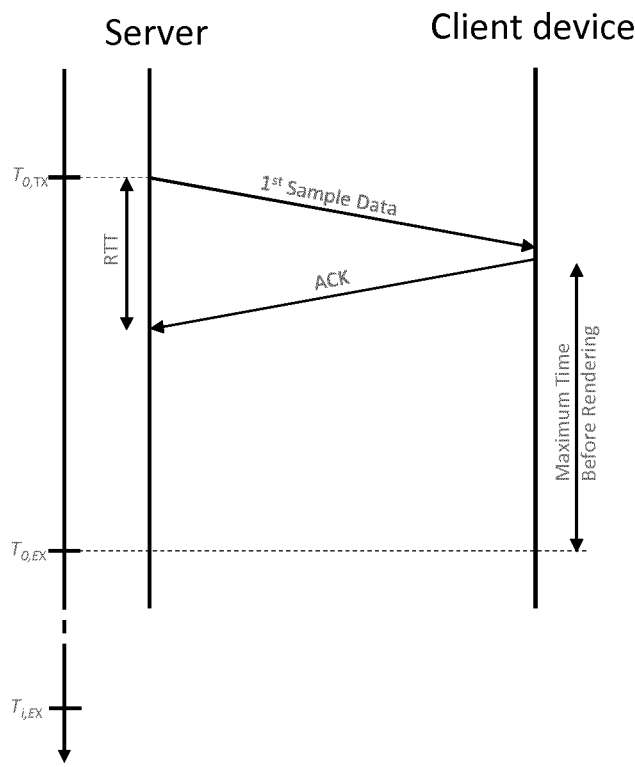
FIG. 11 depicts the expiration time associated with the initial payload of a segment of a sequence in accordance with some embodiments.

In an embodiment, as shown in FIG. 11, the expiration time $t_{0,EX}$ of the initial payload 901 of a segment (and more particularly to the first sample of the segment) to be delivered is obtained as follows:

$$t_{0,EX} = t_{0,TX} + MTBR + RTT/2$$

wherein:
- $t_{0,TX}$ corresponds to the time for transmission of the segment (e.g. corresponding to buffering time at server side);
- MTBR defines the Maximum Time Before Rendering at the client side. In an embodiment, the MTBR depends on a maximum buffering time of the segment at the device (i.e. the maximum time spent by the segment in a buffer) before processing and on the decoding time (i.e. the beginning of the decoding of the segment by the client device). This time is implementation dependent and can be provided by the client device 100 to the server 300. In one illustrative but non-limitative example, the MTBR is equal to the maximum buffering time plus the decoding time;
- RTT/2 is an evaluation of the segment transmission duration between the server 300 and the client device 100.

From the determined expiration time $t_{0,EX}$ of the initial payload of a segment, the server 300 can derive the expiration time for the $i^{th}$ sample of the content of said segment as follows:

$$t_{i,EX} = t_{0,EX} + i*SP$$

wherein SP corresponds to the Sample Period (i.e. the frame period in case of video; or the audio sample for sound).

It should be understood that the expiration time of the initial payload of a segment corresponds to the expiration time of the first video frame or the first audio sample to be processed of that segment.

In a step 1002, the server 300 starts delivering (e.g. via streaming controller 303 and/or communication circuitry 302 and/or its processor(s) 305) to the client device 100 segments belonging to a sliding window 700 as defined above. A new specific header 902 is added to the payload of every segment delivered by the server 300. The specific header 902 (e.g. arranged at the beginning of the payload) comprises a length of the payload of the segment and a segment number. The length field of the specific header allows an application layer to locate the position of the next segment (which can be needed since the segment length is known by the TCP stack but cannot be made accessible to an upper application layer). The segment number allows to reorder data before processing.

In a step 1003, the server 100 (e.g. via its streaming controller 303 and/or processor 305) determines that the expiration time of the initial payload of a segment belonging to the sliding window 700 is reached without reception of a corresponding acknowledgment from the device 100.

In a step 1004, when the expiration time of the initial payload of a segment belonging to the sliding window 700 is reached without reception of a corresponding acknowledgment from the device 100, the server 300 resends said non-acknowledged segment with a new payload corresponding to the initial payload of the next segment to be transmitted through the sliding window 700. The sequence number associated with the resent segment remains unchanged, only the initial payload is modified.

It should be noted that the next segment to be transmitted through the sliding window is not necessarily the segment adjacent to the sliding window 700 (especially when the content of said adjacent segment is also obsolete, i.e. the expiration time of the initial payload of this segment is reached). In addition, in another embodiment, when the length of the payload differs between segments (i.e. the length of the payload is not constant and identical for every segment), the new payload of the non-acknowledged segment can comprise the initial payloads of several next segments to be transmitted through the sliding window (e.g. the sum of the lengths of the initial payloads of next segments to be transmitted is equal to the length of the initial payload of the non-acknowledged segment). In a variant, the new payload of the non-acknowledged segment can comprise a part of the initial payload of a next segment to be transmitted through the sliding window, when the initial payload of the next segment exceeds the initial payload of the non-acknowledged segment.

To that end, the server 300 can further check whether the new payload replacing the initial payload of the non-acknowledged segment (i.e. Segment 3 in the example of FIG. 13) is obsolete (i.e. the associated expiration time is reached). In case the new considered payload is also expired, the server 300 will consider the initial payload of a next segment, for instance adjacent to the segment embedding the considered payload, also expired.

Figure 12:
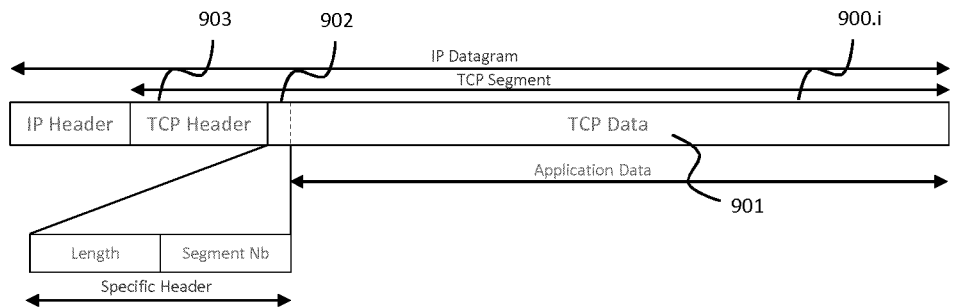
FIG. 12 shows an exemplary IP datagram comprising a TCP segment in accordance with some embodiments.

As shown in FIG. 12, TCP providing reliable, ordered, and error-checked delivery of a stream of bytes between applications running on hosts communicating via an IP network, once the non-acknowledged segment embedding the new payload has been received, the TCP layer delivers to the upper layer the segments of the sliding window 700 in the segment order as those segments are seen as a contiguous series of data. The upper layer will be informed that the non-acknowledged segment needs to be reordered before processing, thanks to the added specific header of the payload.

Besides, the subsequent segments of the sequence of segments conveying the multimedia content which are not yet delivered through the sliding window 700 will also have their initial payload transferred to a previous segment (not yet transmitted) in the sequence order. Their initial payload will be further replaced, for instance, by the payload of a next adjacent segment to be transmitted in the sequence order. Nevertheless, the sequence number of the segments for which the initial payload is replaced remains unchanged.

Figure 13:
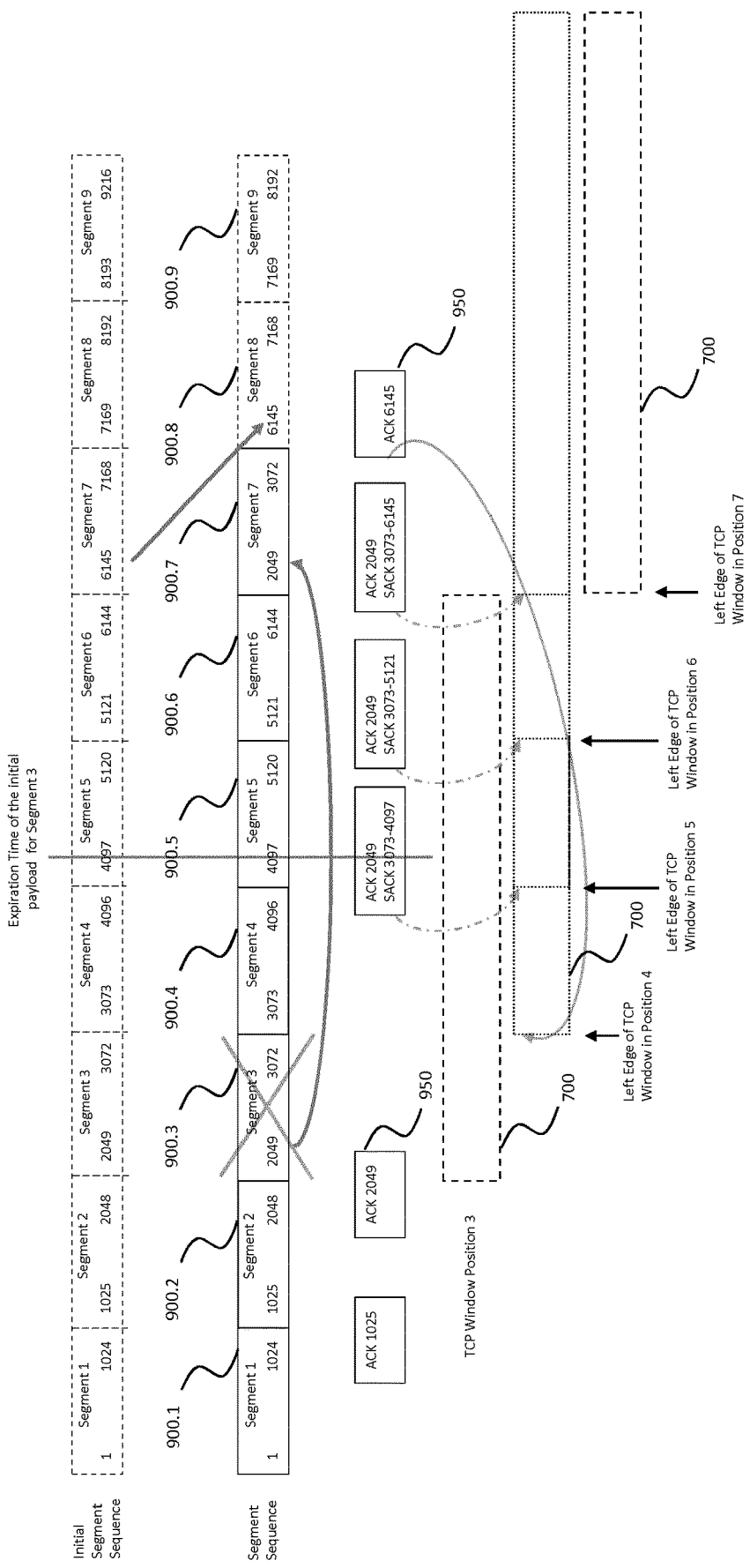
FIG. 13 shows the transfer of a sequence of segments from the server to the client device of FIG. 1 when a sliding window mechanism is implemented, according to some embodiments.

In the example of FIG. 13 similar to the one of FIG. 9 except that the method 1000 is now implemented at the server 300, the sliding window 700 is blocked in position 3 due to the absence of acknowledgment by the device 100 of Segment 3 (associated with the sequence number 3072) sent by the server 300. In position 3 of the sliding window 700, Segments 3 to 6 can be transmitted by the server 300 to the device 100. At the expiration time of the initial payload of Segment 3, Segments 4 to 6 (900.4 to 900.6) have already been transmitted and acknowledged by the device 100 with ACK messages comprising the SACK option. Segment 7 (900.7) cannot be sent by the server 300 since it is outside of the sliding window 700, but will be the next segment to be transmitted through the sliding window 700 (once shifted in Position 4).

The absence of reception of an ACK message (with SN=2049) acknowledging Segment 3 (900.3) prevents the server 300 from updating the sliding window 700 to Position 4. When the server 300 receives the acknowledgment for Segment 4 through an ACK (with SN=2049) having the SACK option (SN=3073 to SN=4097), it cannot update the sliding window 700 to Position 5 because of the acknowledgment of Segment 3 is missing. The same behavior occurs upon reception of the ACK (with SN=2049) having the SACK option (SN=3073 to SN=5121) for acknowledgment of Segment 5 and of the ACK (with SN=2049) having the SACK option (SN=3073 to SN=6145) for acknowledgment of Segment 6.

However, thanks to the method 1000, the initial payload of the Segment 7 (900.7) can be sent with Segment 3 (900.3), instead of the initial payload of Segment 3, now obsolete. This is transparent for the TCP layer of the client 100 since it does not process data within the segments. The Segment 7 is now seen as Segment 3, i.e. a segment of 1024 bytes numbered between 2049 and 3072. The TCP header of the Segment 3 as modified remains unchanged (except checksum), only its initial payload is changed.

When the client device 100 finally receives the Segment 3 with the initial payload of Segment 7, it acknowledges with an ACK message specifying the sequence number associated with the next expected byte (i.e. the first byte of the initial payload of Segment 7 corresponding to SN=6145, which has already been transmitted with Segment 3). Upon reception of such an ACK, the server updates the TCP window 700 to Position 7.

Due to the change of the initial payload of Segment 3 with the initial payload of a Segment 7, the server 300 continues to deliver segments through the sliding window 700 by replacing their initial payload. For example, the initial payload of Segment 8 (if not expired) is transmitted with Segment 7, sequence number identified in Segment 7 remaining unchanged (i.e. SN=6145). Similarly, the initial payload of Segment 9 (if not expired) is transmitted with Segment 8, sequence number identified in Segment 8 being unchanged (i.e. SN=7169).

In case the initial payload of a segment to be transferred to a previous segment in the sequence order for transmission is also obsolete, the initial payload of a next segment in the sequence order can be considered.

Figure 14:
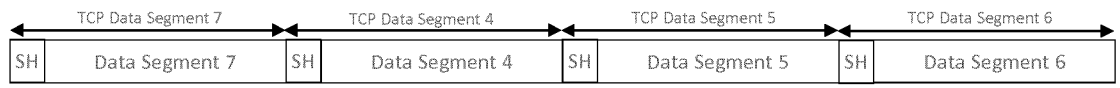
FIG. 14 shows the payloads of received segments of the sequence of FIG. 13 according to some embodiments.
Figure 15:
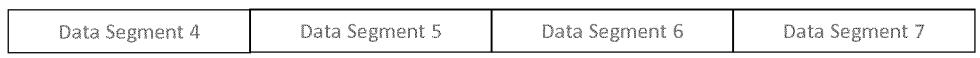
FIG. 15 shows the reordered payloads of received segments of FIG. 14.

FIG. 14 shows the payloads of the received Segment 3 to 6 delivered by the TCP layer of the device 100 to the upper layer. As shown, the payloads are delivered according to the sequence number of their corresponding segments, so that the initial payload of Segment 7 transmitted by Segment 3 is delivered before the initial payload of Segments 4 to 6. The segment number of the added specific header is then used by the upper layer to reorder data in a proper order as illustrated in FIG. 15.

The implementation of the above described method can allow to improve the bandwidth usage by avoiding unnecessary retransmission of obsolete data, for example during a streaming session, while preserving the reliability of the network protocol (such as TCP) supporting the data delivery. The network resources are then used to deliver data which will be really used by the client devices instead of useless data. In addition, it can allow to reduce the latency when facing packet loss and/or delay in the network and to reduce the buffering size in TCP transmitter. Such an implementation remains compliant with the TCP protocol.

While the above-mentioned embodiments have been described with an implementation of a TCP connection, other appropriate network protocols might further be used.

It should also be understood that, from an application point of view, to implement the method 1000, the application will inform the server 300 that it does support non ordered data.

More generally, in an embodiment, a network equipment configured to be in communication with a device through a network for delivering data packets comprising an initial payload, comprises one or more processors configured for:
  obtaining an expiration time for the initial payload of the data packets to be delivered to the device,
  delivering to the device data packets belonging to a sliding window moving according to data packet acknowledgments,
  when the expiration time of the initial payload of a data packet belonging to the sliding window is reached without reception of a corresponding acknowledgment from the device, resending said data packet with a new payload corresponding to the initial payload of at least one next data packet to be transmitted through the sliding window.

In another embodiment, a method to be implemented at a network equipment configured to be in communication with a device through a network for delivering data packets comprising an initial payload, comprises:
  obtaining an expiration time for the initial payload of the data packets to be delivered to the device,
  delivering to the device data packets belonging to a sliding window moving according to data packet acknowledgments,
  when the expiration time of the initial payload of a data packet belonging to the sliding window is reached without reception of a corresponding acknowledgment from the device, resending said data packet with a new payload corresponding to the initial payload of at least one next data packet to be transmitted through the sliding window.

In an embodiment, the expiration time of the new payload of the resent data packet is not reached yet.

In an embodiment, when at least one data packet has been resent with a new payload, the initial payload of a subsequent packet not transmitted yet through the sliding window is transferred to one or more previous packets for delivery.

In an embodiment, each data packet being associated with a sequence number, the sequence number associated with said resent data packet remains unchanged.

In an embodiment, when the TCP protocol is implemented for transmitting the data packets, the TCP header of the resent data packet remains unchanged, except checksum.

In an embodiment, the expiration time of the initial payload of a data packet corresponds to an expiration time of a first video frame or a first audio sample to be processed of that data packet.

In an embodiment, wherein the expiration time of the initial payload of a data packet depends on a maximum time before rendering and a time of transmission of the data packet from the network equipment to the device.

In an embodiment, wherein the maximum time before rendering of a data packet depends on a maximum buffering time of the data packet at the device before processing and a decoding time.

In an embodiment, a specific header is added to the initial payload of every data packet.

In an embodiment, the specific header of a data packet comprises a length of the initial payload of the data packet and a packet number.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

Besides, it is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

The invention claimed is:

1. A network equipment configured to be in communication with a device through a network for delivering data packets comprising an initial payload, the network equipment comprising one or more processors configured for:
   obtaining an expiration time for the initial payload of the data packets to be delivered to the device,
   delivering to the device data packets belonging to a sliding window moving according to data packet acknowledgments, and
   when the expiration time of the initial payload of a data packet belonging to the sliding window is reached without reception of a corresponding acknowledgment from the device, resending the data packet with a new payload replacing the initial payload of the data packet, the new payload corresponding to the initial payload of at least one next data packet to be transmitted through the sliding window when the expiration time of the new payload of the resent data packet is not reached yet;
   wherein the expiration time of the initial payload of the data packet depends on a maximum time before rendering and a time of transmission of the data packet from the network equipment to the device, the maximum time before rendering depending on a maximum buffering time of the data packet at the device before processing and a decoding time.

2. The network equipment of claim 1, wherein, when at least one data packet has been resent with the new payload, the initial payload of a subsequent packet not transmitted yet through the sliding window is transferred to one or more previous packets for delivery.

3. The network equipment of claim 1, wherein, each data packet being associated with a sequence number, the sequence number associated with the resent data packet remains unchanged.

4. The network equipment of claim 1, wherein, when a TCP protocol is implemented for transmitting data packets, a TCP header of the resent data packet remains unchanged, except checksum.

5. The network equipment of claim 1, wherein the expiration time of the initial payload of the data packet corresponds to an expiration time of a first video frame or a first audio sample to be processed of that data packet.

6. The network equipment of claim 1, wherein a specific header is added to the initial payload of every data packet.

7. The network equipment of claim 1, wherein a specific header of the data packet comprises a length of the initial payload of the data packet and a packet number.

8. A method to be implemented at a network equipment configured to be in communication with a device through a network for delivering data packets comprising an initial payload, the method comprising:
   obtaining an expiration time for the initial payload of the data packets to be delivered to the device,
   delivering to the device data packets belonging to a sliding window moving according to data packet acknowledgments, and
   when the expiration time of the initial payload of a data packet belonging to the sliding window is reached without reception of a corresponding acknowledgment from the device, resending the data packet with a new payload replacing the initial payload of the data packet, the new payload corresponding to the initial payload of at least one next data packet to be transmitted through the sliding window when the expiration time of the new payload of the resent data packet is not reached yet;

wherein the expiration time of the initial payload of the data packet depends on a maximum time before rendering and a time of transmission of the data packet from the network equipment to the device, the maximum time before rendering depending on a maximum buffering time of the data packet at the device before processing and a decoding time.

9. The method of claim 8, wherein, when at least one data packet has been resent with the new payload, the initial payload of a subsequent packet not transmitted yet through the sliding window is transferred to one or more previous packets for delivery.

10. The method of claim 8, wherein, each data packet being associated with a sequence number, the sequence number associated with the resent data packet remains unchanged.

11. The method of claim 8, wherein, when a TCP protocol is implemented for transmitting data packets, a TCP header of the resent data packet remains unchanged, except checksum.

12. The method of claim 8, wherein the expiration time of the initial payload of the data packet corresponds to an expiration time of a first video frame or a first audio sample to be processed of that data packet.

13. The method of claim 8, wherein a specific header is added to the initial payload of every data packet.

14. The method of claim 8, wherein a specific header of the data packet comprises a length of the initial payload of the data packet and a packet number.

15. A device configured to be in communication with a network equipment through a network for receiving data packets comprising an initial payload, the device comprising one or more processors configured for:

receiving from the network equipment data packets belonging to a sliding window moving according to data packet acknowledgments, when an expiration time of the initial payload of a data packet belonging to the sliding window is reached without sending of a corresponding acknowledgment by the device, receiving the data packet with a new payload replacing the initial payload of the data packet, the new payload corresponding to the initial payload of at least one next data packet to be transmitted through the sliding window when the expiration time of the new payload of the resent data packet is not reached yet, the expiration time of the initial payload of the data packet depending on a maximum time before rendering and a time of transmission of the data packet from the network equipment to the device, the maximum time before rendering depending on a maximum buffering time of the data packet at the device before processing and a decoding time, and reordering received data packets thanks to a specific header added to initial payload of data packets.

16. A method to be implemented at device configured to be in communication with a network equipment through a network for receiving data packets comprising an initial payload, the method comprising:

receiving from the network equipment data packets belonging to a sliding window moving according to data packet acknowledgments, when an expiration time of the initial payload of a data packet belonging to the sliding window is reached without sending of a corresponding acknowledgment by the device, receiving the data packet with a new payload replacing the initial payload of the data packet, the new payload corresponding to the initial payload of at least one next data packet to be transmitted through the sliding window when the expiration time of the new payload of the resent data packet is not reached yet, the expiration time of the initial payload of the data packet depending on a maximum time before rendering and a time of transmission of the data packet from the network equipment to the device, the maximum time before rendering depending on a maximum buffering time of the data packet at the device before processing and a decoding time, and reordering received data packets thanks to a specific header added to initial payload of data packets.

17. A non-transitory program storage device, readable by a computer, tangibly embodying a program of instructions executable by the computer to perform a method to be implemented at a network equipment configured to be in communication with a device through a network for delivering data packets comprising an initial payload, the method comprising:

obtaining an expiration time for the initial payload of the data packets to be delivered to the device, delivering to the device data packets belonging to a sliding window moving according to data packet acknowledgments, and when the expiration time of the initial payload of a data packet belonging to the sliding window is reached without reception of a corresponding acknowledgment from the device, resending the data packet with a new payload replacing the initial payload of the data packet, the new payload corresponding to the initial payload of at least one next data packet to be transmitted through the sliding window when the expiration time of the new payload of the resent data packet is not reached yet;

wherein the expiration time of the initial payload of the data packet depends on a maximum time before rendering and a time of transmission of the data packet from the network equipment to the device the maximum time before rendering depending on a maximum buffering time of the data packet at the device before processing and a decoding time.

18. The non-transitory program storage device of claim 17, wherein, when at least one data packet has been resent with the new payload, the initial payload of a subsequent packet not transmitted yet through the sliding window is transferred to one or more previous packets for delivery.

19. The non-transitory program storage device of claim 17, wherein, each data packet being associated with a sequence number, the sequence number associated with the resent data packet remains unchanged.

20. The non-transitory program storage device of claim 17, wherein, when a TCP protocol is implemented for transmitting data packets, a TCP header of the resent data packet remains unchanged, except checksum.

* * * * *